No. 712,578. Patented Nov. 4, 1902.
J. N. NEWSOM & L. MALONE.
VEHICLE WHEEL GUIDE AND TRACK.
(Application filed July 3, 1901.)
(No Model.) 2 Sheets—Sheet 1.
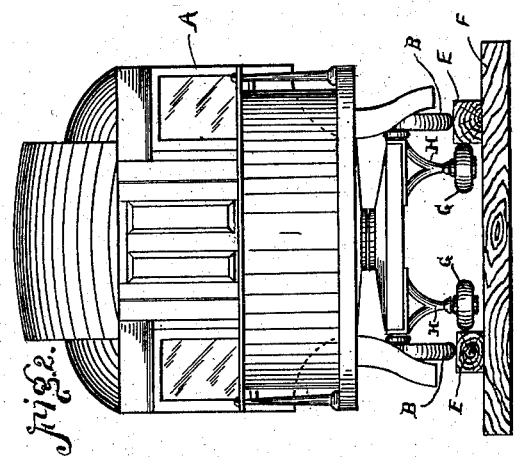
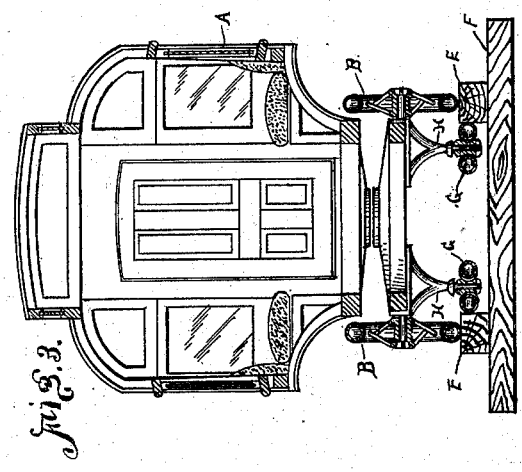
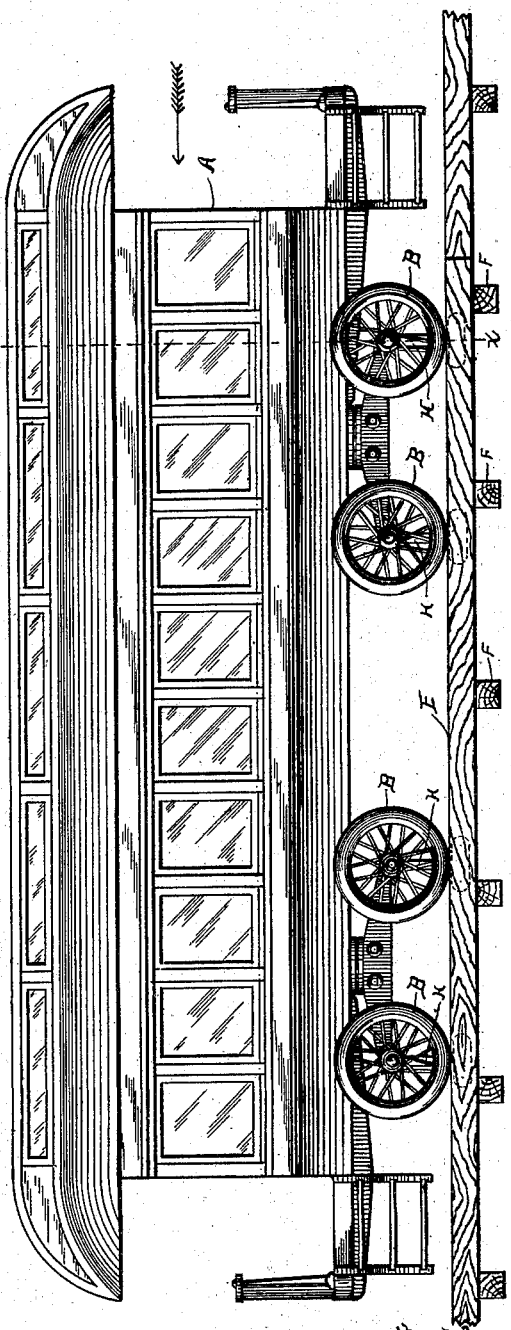
Witnesses.
P. C. Campbell.
M. J. Everson.
Inventors.
Joseph N. Newsom
and Leslie Malone,
By J. M. Plaisted, Atty.

No. 712,578. Patented Nov. 4, 1902.
J. N. NEWSOM & L. MALONE.
VEHICLE WHEEL GUIDE AND TRACK.
(Application filed July 3, 1901.)
(No Model.) 2 Sheets—Sheet 2.

Witnesses
T. E. Campbell
M. J. Everson.

Inventors.
Joseph N. Newsom and
Leslie Malone.
By H. M. Plaisted, Atty.

UNITED STATES PATENT OFFICE.

JOSEPH N. NEWSOM AND LESLIE MALONE, OF ST. LOUIS, MISSOURI.

VEHICLE-WHEEL GUIDE AND TRACK.

SPECIFICATION forming part of Letters Patent No. 712,578, dated November 4, 1902.

Application filed July 3, 1901. Serial No. 66,943. (No model.)

*To all whom it may concern:*

Be it known that we, JOSEPH N. NEWSOM and LESLIE MALONE, citizens of the United States, residing at St. Louis, State of Missouri, have invented certain new and useful Improvements in Vehicle-Wheel Guides and Tracks, of which the following is a specification, reference being had therein to the accompanying drawings.

This invention relates to certain new and useful improvements in vehicle-wheel guides and tracks, the peculiarities of which will be hereinafter fully described and claimed.

The object of our invention is to provide an attachment forming a guide for vehicle-wheels and a track especially adapted to coöperate therewith.

Figure 4:
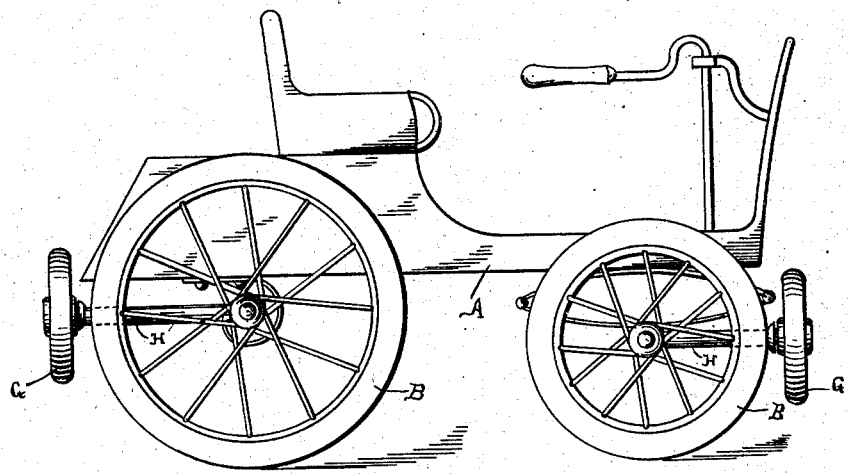
Figures 5, 6:
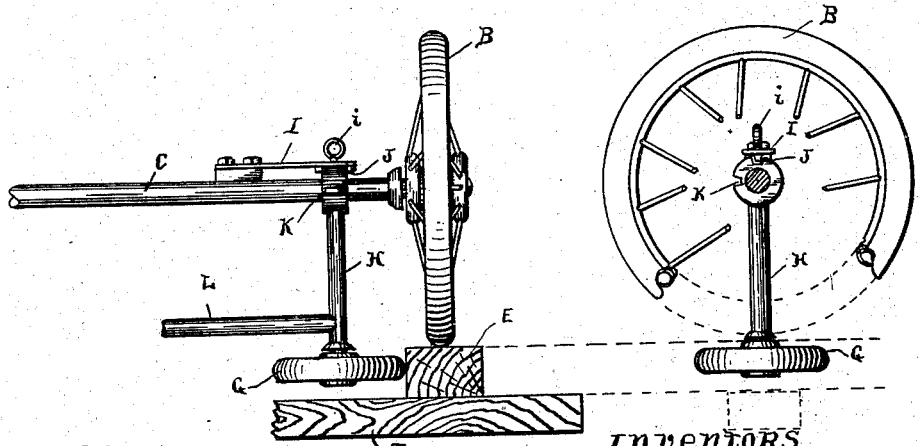

In the accompanying drawings, on which like reference-letters indicate corresponding parts, Figure 1 represents a passenger-car with our attachment and track therefor; Fig. 2, an end view of Fig. 1 in the direction of the arrow; Fig. 3, a cross-section on the line $x\,x$ of Fig. 1; Fig. 4, a side view of an automobile, showing our attachment temporarily adjusted in a raised position; Fig. 5, a detail of the front guide-wheel mounting, and Fig. 6 an end view of Fig. 5.

Referring to the drawings, the letter A designates the body of a vehicle, having carrying-wheels B, mounted on axles C in the usual way. Any kind of tire may be used, but a cushioned tire is preferred, of rubber, pneumatic or otherwise. The track consists of longitudinal rails E with a plain flat top and vertical inner face, preferably secured to sleepers or cross-ties F and preferably of wood. A cushioned tire running on such wooden rails does not beat down or disintegrate the fibers of the wood, as do metal wheels on metal tracks. Besides the cheapness of construction, this combination secures a noiseless easy-riding vehicle.

To keep the carrying-wheels of the vehicle on the flat plain surface of the rails, we provide auxiliary wheels G for two or more of the carrying-wheels and mount each of them on vertical axles by a hanger H, supported by the cross-axle or other part of the vehicle between the rails, so as to be below the top of the track and bear on the inner faces of rails. They thus limit the lateral movement and maintain the carrying-wheels substantially in the center of the tops of the rails. The fastening-bolts are placed near the sides of the rails, as shown, so as to leave the center portion of the rails clear for the carrying-wheels. The hangers H brace the guide-wheels against any lateral pressure, and are also preferably cushioned to ease off any lateral movement that occurs.

There is always a certain amount of play, even with flanged wheels, and the jar on striking a curve is often severe. As our wheels have no flanges, preferably this lateral movement is taken up by the guide-wheels, and it is desirable to cushion them. Thus the lateral movement is taken up yieldingly, and even on a curve the shock is practically done away with, while on a straight track the cushion tires facilitate the easy riding of the vehicle. We thus overcome the shocks incident to hard guide-wheels and make our device especially applicable to the higher class of vehicles, such as automobiles, in which comfort and easy riding is a desideratum.

On account of the simplicity and cheapness of a wooden track and its durability when cushioned wheels are used, as stated above, a track may be run through picturesque localities, as a cinder-path for bicycles is laid out in a park. Such tracks may be used for permanent rolling-stock, and our guiding attachment may be fixed or they may be reserved for automobiles provided with our attachment for guiding them thereon. In going to and from the track each guiding attachment is raised to clear the ground and is adjusted in a vertical plane in the line of travel to its lower position at the track. Any suitable device for securing the hangers in either position may be used, such as a spring-catch I, engaging notches J K in the head of the hanger and lifted by a handle $i$ or otherwise. A cross-brace L from one hanger to the other may be used.

As the special feature of our invention is its use in connection with ordinary road-vehicles, we do not claim it in connection with flanged wheels, such as on steam and street cars, nor with rails having curved sides or overhanging side flanges. By our attachment wheels that may travel anywhere on an ordinary road are guided in narrow paths on plain-faced rails without flanges on wheels or track, and by using cushioned tires, as in automobiles, and a wooden track the best combination is obtained and a noiseless easy-riding vehicle is the result. As there are no overhanging flanges nor flanged wheels, the guide-wheels are readily swung down in vertical planes when the automobile arrives at the track, and on leaving the track the guide-wheels are likewise readily swung upward in vertical planes in the direction of motion.

Having thus fully described our invention, what we claim as new, and desire to secure by Letters Patent, is—

1. The combination with plain track-rails as described, of vehicle-carrying wheels with cushion-tires, guide-wheels with cushion-tires for the plain sides of said rails, guide-wheel supports having transverse horizontal bearings, transverse horizontal journals for said supports, suitable transverse bracing for said supports to allow the guide-wheels to rise by adjustment in vertical planes in the line of travel without lateral adjustment, and means to secure said supports in their lower and their upper position respectively.

2. The combination with plain track-rails as described, of vehicle-carrying wheels, guide-wheels for the plain sides of said rails, guide-wheel supports having transverse horizontal bearings, transverse horizontal journals for said supports, transverse bracing between adjacent supports to allow the guide-wheels to rise by adjustment in vertical planes in the line of travel without lateral movement, and means to secure said supports in their lower and their upper position respectively.

3. The combination with vehicle-carrying wheels, and guide-wheels therefor, of adjustable supports for said guide-wheels each consisting of a hanger having an axle for the guide-wheel at one end and a bearing-head having notches, a journal for said hanger-head located transversely to the track, and a spring-catch to lock in one notch or another according to the adjusted position of said hanger and its wheel.

In testimony whereof we affix our signatures in presence of two witnesses.

JOSEPH N. NEWSOM.
LESLIE MALONE.

Witnesses:
H. M. PLAISTED,
J. S. CABANNE.